July 21, 1936.  H. T. GOODWIN  2,048,158
APPARATUS FOR PURIFYING AND CLEANING WATER
Filed April 9, 1935
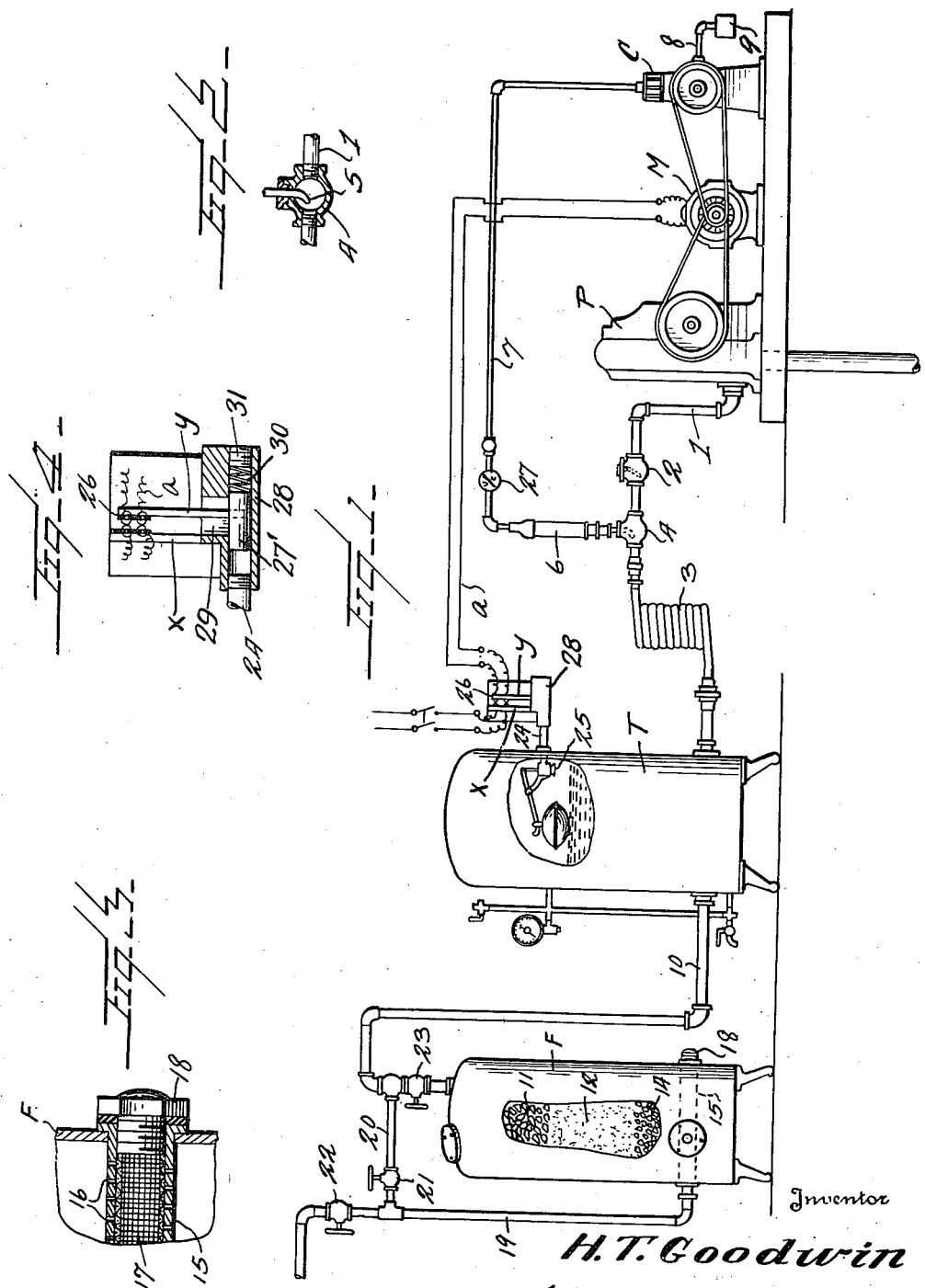
Inventor
H. T. Goodwin
By Watson E. Coleman
Attorney Patented July 21, 1936

2,048,158

UNITED STATES PATENT OFFICE 2,048,158

APPARATUS FOR PURIFYING AND CLEANING WATER

Harold T. Goodwin, Memphis, Tenn.

Application April 9, 1935, Serial No. 15,463

3 Claims. (Cl. 210—26)

This invention relates to an apparatus for purifying and cleaning water, and it is an object of the invention to provide an apparatus of this kind including means whereby air under pressure is mixed with the water while in transit to break down the water in a manner to release all $CO_2$ gases from the water, together with means for collecting and releasing such separated gases.

Another object of the invention is to provide an apparatus of this kind including a pressure tank together with means for delivering water to the tank and wherein such water before reaching the tank is subjected to the action of air injected therein to break down the water to liberate the $CO_2$ gases in the water.

The invention consists in the details of construction and in the combination and arrangement of the several parts of my improved apparatus for purifying and cleaning water whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in elevation with portions broken away and of a diagrammatic character illustrating an apparatus constructed in accordance with an embodiment of my invention;

Figure 2 is a fragmentary view partly in section and partly in elevation illustrating the means herein disclosed whereby air is discharged in the water line;

Figure 3 is a fragmentary sectional view with portions in elevation taken through the filter illustrating the strainer comprised therein;

Figure 4 is a fragmentary view partly in elevation and partly in section illustrating the circuit closer or switch as herein comprised.

As disclosed in the accompanying drawing, P denotes a pump having its inlet in proper communication with a source of water supply in a well or the like. Leading from this pump P is a carry-off pipe 1 which discharges within the lower portion of a pressure or storage tank T. Interposed in this pipe line 1 is a non-return or check valve 2 to prevent retrograde flow through the pipe line 1 back to the pump P, and said pipe line 1 also has interposed therein a coil 3 preferably of copper tubing for a purpose to be hereinafter more particularly referred to.

At a point between the non-return or check valve 2 and the coil 3 the pipe line 1 is provided with a slightly enlarged chamber 4 into which extends a nozzle 5. This nozzle 5 is carried by and in communication with an end portion of a cylindrical or tubular member 6 providing an expansion chamber.

The opposite end portion of this member 6 has in communication therewith a pipe line 7, preferably copper tubing, leading from the discharge of a desired air compressor C. Associated with the induction 8 of the compressor C is a suitable air cleaner 9. As the character and construction of this cleaner 9 forms no particular part of the present invention a detailed description is not deemed necessary.

The pump P and the compressor C as herein disclosed are both in driven connection with a prime mover M herein disclosed as an electric motor of a conventional type. During the period the pump P is operating to cause water to flow through the pipe line 1 to the tank T, the compressor C will operate to deliver from the nozzle 5 a jet of air which operates to effectively break down the water to a condition of foam whereby $CO_2$ gases in the water are liberated before entering the tank T. This liberation is further facilitated by the travel of the water and air through the coil 3, said coil serving as a mixing element. It is also to be stated that this breaking down of the water in addition to liberating the gases also releases rust and other foreign substances carried by the water.

Leading from the lower portion of the tank T is a pipe line 10 which discharges in the upper portion of a filter F. This filter F may be of any type preferred but, as herein disclosed, comprises a top portion 11 of charcoal, a central portion 12 of sand and a lower portion 14 of gravel.

Extending radially through the lower portion of the filter F is a tubular member 15 preferably a brass pipe having its wall within the filter F provided therethrough with a plurality of minute openings 16 and engaged within this member or pipe 15 is a strainer element 17 adapted to be removed and replaced as desired and without the necessity of emptying the filter F. This can be readily done as one end of the tubular member or pipe 15 is closed by a removable plug 18. The opposite end portion of this member or pipe 15 has leading therefrom a hose or supply pipe line 19. Interposed between this line 19 and the pipe line 10 is a bypass pipe 20 having interposed therein a valve 21 while the pipe line 19 beyond this bypass 20 is provided with a valve 22. Interposed in the line 10 between the bypass pipe 20 and the filter F is a valve 23. By closing the valves 22 and 23 and opening the valve 21 an effective back washing may be obtained for cleaning out the filter F.

As the mixture of air and water with separated gases enters the tank T the separated gases and air will rise to the upper portion of said tank while the water of course will be maintained within the lower portion of the tank. In communication with the upper portion of the tank T is a relief vent 24, the same extending partially within the tank T and having coacting with said inner end a float controlled valve 25 so that when the level of the water within the tank T rises to a predetermined point, the valve 25 will open and thus allow the escape of the separated gases.

This action of the float valve 25 also effects an opening of the switch 26 interposed in the operating circuit $a$ for the motor M so that with a given quantity of water within the tank T the pump P and the compressor C are inactive.

As particularly illustrated in Figure 4 the switch 26 comprises a stationary member X and a movable member Y. The movable member Y is carried by a plunger 27' working within a barrel 28 with which the relief vent 24 communicates. This member Y is also disposed through a discharge opening or port 29 in the barrel 28. The plunger 27' closes this port or opening 29 and is maintained in such position by an expansible member 30 interposed between the plunger 27' and a plug 31 closing the outer end of the bore of the barrel 28. When the valve 25 opens the gases will pass out through the pipe 24 and under a pressure sufficient to move the plunger 27' a distance to open the port 29 for the escape of the gases and also moves the plunger 27' a distance sufficient to break the contact between the members X and Y of the switch. As the liquid level within the tank T lowers there will also be a reduction in the pressure of the gas within the tank above the water line together with the closing of the valve 25 permitting the member Y to return to contact with the member X under the action of the spring 30.

The member 6, or more particularly the bore thereof as hereinbefore stated, is of a diameter in excess of the diameter of the bore of the pipe line 7 so that the member 6 will serve effectually as an expansion chamber where air may collect to prevent any water from forcing its way back through the line 7 to the compressor C. Also interposed in this line 7 is a non-return or check valve 27 to further provide means to prevent air flowing back to the compressor.

From the foregoing description it is thought to be obvious that an apparatus for purifying and cleaning water constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An apparatus of the class described comprising a pressure tank, a pipe line delivering water within the tank, means for admitting air under pressure into said line, said means for admitting air including an expansion chamber in communication with said line, and an air line leading from a source of air under pressure to the expansion chamber, said expansion chamber extending vertically above the pipe line delivering water, with the air line entering at the top of the expansion chamber.

2. An apparatus of the class described comprising a tank, a water line discharging into the tank, an air line discharging in the first named line, a filter, a pipe line leading from the tank to the filter, a tubular member transversely disposed entirely through the filter, the portion of said member within the filter having openings in its wall, a removable strainer within said tubular member, a water carry-off pipe in communication with one extremity of said tubular member, and a removable plug closing the opposite extremity of the tubular member, said plug being accessible from without the filter.

3. An apparatus of the class described comprising a storage tank, a pump in communication with a source of water supply, a pipe line leading from the pump and discharging within the tank, a compressor, an air line leading from the compressor and discharging within the first named pipe line in advance of the tank, an electric motor common to both the pump and the compressor for operating the same, a relief vent in communication with the upper portion of the tank, a float controlled valve associated with the relief vent, a normally closed switch interposed in the operating circuit for the electric motor, and means operated by the pressure admitted within the vent for adjusting said switch into open position.

HAROLD T. GOODWIN.